(12) United States Patent
Gupta et al.

(10) Patent No.: US 8,534,832 B2
(45) Date of Patent: Sep. 17, 2013

(54) PROGRESSIVE ADDITION LENS DESIGN

(75) Inventors: Amitava Gupta, Roanoke, VA (US);
Ronald D. Blum, Roanoke, VA (US)

(73) Assignee: PixelOptics, Roanoke, VA (US)

( * ) Notice: Subject to any disclaimer, the term of this patent is extended or adjusted under 35 U.S.C. 154(b) by 183 days.

(21) Appl. No.: 12/848,713

(22) Filed: Aug. 2, 2010

(65) Prior Publication Data

US 2011/0116037 A1    May 19, 2011

Related U.S. Application Data

(60) Provisional application No. 61/262,601, filed on Nov. 19, 2009.

(51) Int. Cl.
*G02C 7/00* (2006.01)
*G02C 7/02* (2006.01)

(52) U.S. Cl.
USPC ............ 351/159.42; 351/159.06; 351/159.07; 351/159.46

(58) Field of Classification Search
USPC .............. 351/159.06, 159.07, 159.42, 159.46
See application file for complete search history.

(56) References Cited

U.S. PATENT DOCUMENTS

| | | | | |
|---|---|---|---|---|
| 6,106,118 | A | * | 8/2000 | Menezes et al. ......... 351/159.42 |
| 6,390,623 | B1 | * | 5/2002 | Kokonaski et al. ...... 351/159.42 |
| 6,709,105 | B2 | | 3/2004 | Menezes |
| 2008/0218689 | A1 | * | 9/2008 | Blum et al. .................... 351/169 |
| 2010/0283963 | A1 | * | 11/2010 | Giraudet et al. .............. 351/169 |
| 2012/0200822 | A1 | * | 8/2012 | Kaga et al. ............... 351/159.42 |

FOREIGN PATENT DOCUMENTS

FR    2924824    * 12/2007

OTHER PUBLICATIONS

The U.S. Appl. No. 61/262,601, filed on Nov. 19, 2009.
Ciuffreda et al., "Eye and head movements during low contrast reading with single vision and progressive lenses", Conference Paper—Vision Science and its Applications, Monterey, California, Feb. 9, 2001.
Charman et al., "Optical aspects of tolerance to uncorrected ocular astigmatism", Optometry and Vision Science, vol. 70, No. 2, 1993, pp. 111-117.
Alpins, Noel A., "A new method of analyzing vectors for changes in astigmatism", Conference paper—$3^{rd}$ American-International Congress on Cataract, IOL and Refractive Surgery, Seattle, Washington, May 1993.

* cited by examiner

*Primary Examiner* — Jordan Schwartz
(74) *Attorney, Agent, or Firm* — Sterne, Kessler, Goldstein & Fox P.L.L.C.

(57) ABSTRACT

Aspects of the present invention provide progressive addition lenses (PALs) and techniques for designing PALs that result in improved visual performance for the wearer. PALs of the present invention can have vision zones with widths that are more in line with the actual or functional sizes used by wearers. PALs of the present invention can also introduce controlled amounts of unwanted astigmatism into one or more vision zones. By allowing vision zones to include manageable levels of astigmatism, the resulting PAL can avoid the harsh build-up of astigmatism typically found in conventional PALs at the periphery of the channel and viewing zones. Further, PALs of the present invention can be designed using a merit function to achieve an optimized iterative design that accounts for astigmatism vector orientation and not simply astigmatism magnitude as is the case with conventional PAL design.

9 Claims, 2 Drawing Sheets

PROGRESSIVE ADDITION LENS DESIGN

CROSS-REFERENCE TO RELATED APPLICATIONS

This application claims priority from and incorporates by reference in their entirety the following provisional applications:

U.S. Appl. No. 61/262,601, filed on Nov. 19, 2009.

BACKGROUND OF THE INVENTION

1. Field of the Invention

The present invention generally relates to ophthalmic lenses. More specifically, the present invention provides improved progressive addition lenses (PALs).

2. Background Art

Conventional PALs are typically designed to require the resulting vision zones to be as wide as possible and to be substantially free of unwanted astigmatism. Requiring the vision zones to be free of astigmatism fails to consider the adverse impact on visual comfort caused by rapidly changing the magnitude of oblique astigmatism that consequently builds up on both sides of the channel and the viewing zones. This rapid buildup of astigmatism can also adversely impact the width of the distance vision zone of the resulting PAL. Accordingly, what is needed is an ophthalmic lens design that bases viewing zone widths and acceptable levels of astigmatism on actual wearer use and comfort so as to achieve improved PAL designs.

BRIEF DESCRIPTION OF THE DRAWINGS/FIGURES

DETAILED DESCRIPTION OF THE INVENTION

Aspects of the present invention provide progressive addition lenses (PALs) and techniques for designing PALs that result in improved visual performance and comfort for the wearer. PALs of the present invention can have vision zones with widths that are more in line with the actual or functional sizes used by wearers. PALs of the present invention can also introduce controlled amounts of unwanted astigmatism into one or more vision zones. By allowing vision zones to include controlled levels of astigmatism, the resulting PAL can avoid the steep build-up of astigmatism typically found in conventional PALs at the periphery of the channel and viewing zones. Further, PALs of the present invention can be designed through an iterative optimization process using a merit function that accounts for astigmatism vector orientation and not simply astigmatism magnitude as is the case with conventional PAL design. A merit function of the present invention can be a function that expresses the sum of the magnitudes of one or more optical properties (including, but not limited to, astigmatism) for a network of points on a lens surface with each point assigned a unique weight depending upon the location of the point relative to a viewing zone.

Figure 1:
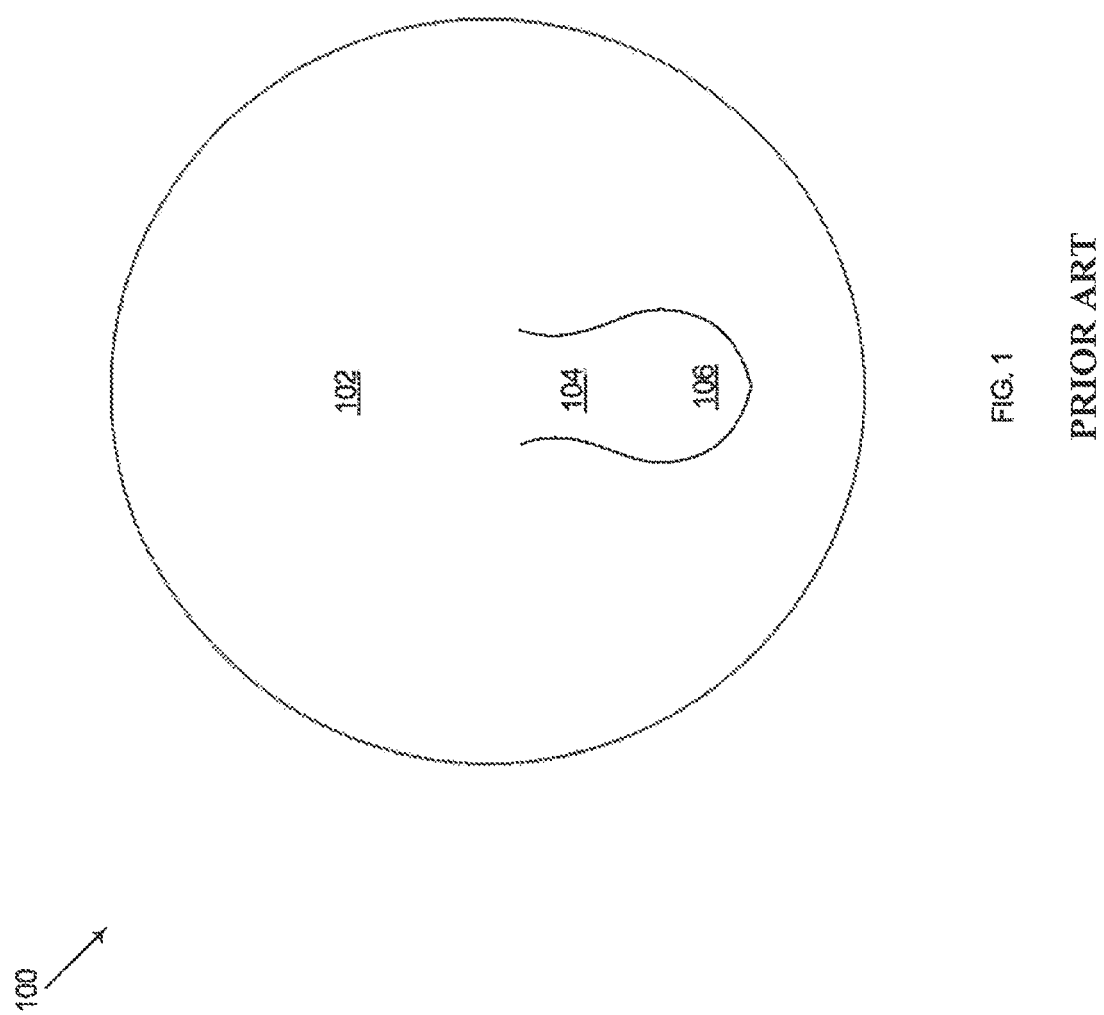
FIG. 1 illustrates a conventional progressive addition lens (PAL).

FIG. 1 illustrates a conventional progressive addition lens (PAL) 100. The PAL 100 can represent a typical state of the art PAL produced using conventional design considerations and requirements. The PAL 100 can comprise a far distance viewing zone 102, an intermediate distance viewing zone 104, and a near distance viewing zone 106. The intermediate distance viewing zone 104 can also be considered to be or can represent a portion of a channel that has a variable optical power. The intermediate distance viewing zone or channel 104 can link or connect the different constant optical powers provided by the far distance viewing zone 102 and the near distance viewing zone 106.

As with most conventional PAL designs, the PAL 100 can be designed to require the intermediate distance viewing zone 104 and the near distance viewing zone 106 to be substantially free of astigmatism and to be as large as possible. As a consequence, the PAL 100 can create large amounts of disturbing astigmatism near the periphery of the viewing zones 104 and 106. Further, these design requirements can cause astigmatism to build up and disturb the integrity of the far distance viewing zone 102. Overall, the conventional design approach of requiring the viewing zones 104 and 106 to be substantially free of astigmatism neglects to account for the adverse impact on visual comfort caused by rapidly changing the magnitude of oblique astigmatism that consequently builds up on both sides of the channel and the viewing zones.

According to an aspect of the present invention, conventional design considerations, including providing vision zones that are substantially free of astigmatism, are recast based on clinically observed visual behaviors of typical lens wearers. Specifically, according to an aspect of the present invention, vision zones can be designed to have widths commensurate with a wearer's actual use of the zone. Further, according to an aspect of the present invention, vision zones can be designed to include controlled levels of astigmatism, thereby enhancing depth of focus and reducing the gradient of resulting astigmatism in the lens (and in some instances, reducing the maximum astigmatism). Overall, PALs of the present invention can provide a more comfortable experience for a wearer and can provide greater functional viewing zones widths in comparison to many conventional lenses.

Head and eye movement studies performed on subjects fitted with test PALs to execute near and intermediate vision tasks (e.g., reading text or viewing a computer screen) show that reduction of the gradient of unwanted astigmatism can make it possible for the eye to use optics having a comparatively greater magnitude of unwanted astigmatism in the viewing zones. Further, according to an aspect of the present invention, the reduction of the gradient of unwanted astigmatism can result in greater overall functional zone widths. For example, work reported by Ciuffreda et al. (e.g., in "Eye and head movements during low contrast reading with single vision and progressive lenses", Conference Paper—Vision Science and its Applications, Monterey, Calif., Feb. 9, 2001) and others on the functional widths of intermediate and near vision zones suggests that functional reading width actually realized by wearers are quite different, and may be determined by the gradients of spherical error or astigmatism at the periphery of the zones as much as the astigmatism magnitude thresholds or limits conventionally adopted to define zone width. As used herein, the term functional width refers to the width on the spectacle lens plane that is actually traversed by the pupil of the wearer, and is contrasted with widths of viewing zones measured according to certain predefined thresholds of power or astigmatism.

This work also suggests that a zone width of greater than 12 mm may be unnecessary because ergonomic limitations can preclude use of a wide intermediate vision zone and that a width of +/−30 deg (14.0 mm or larger) may be unnecessary for the far vision zone and a similar limit may be placed on the width of the near vision zone. Accordingly, PALs of the present invention, in contrast to many conventional designs, can specify viewing zone width requirements that are in line with actual or likely use of the wearer. As such, zone widths of PALs of the present invention can be characterized by a limiting value of astigmatism inside the zone and a maximum gradient of build-up of astigmatism and change in spherical equivalent at their border. The threshold value of astigmatism to be accepted within the viewing zones can be based on clinical data (referred to above and also including work by Charman et al. —"Optical aspects of tolerance to uncorrected ocular astigmatism", Optometry and Vision Science, vol. 70, no. 2, 1993, pgs. 111-117).

According to an aspect of the present invention, it has been recognized that the correction for focus at intermediate and near distances can also take into account depth of focus—which is not considered in most conventional PAL designs. That is, depth of focus considerations that are largely ignored in conventional designs can also influence viewing zone design considerations of PALs of the present invention. Conventional PALs generally provide a purely spherical correction at intermediate and near distances. Contrary to this design approach, according to an aspect to of the present invention, it is recognized that a purely spherical correction at these distances may not be visually as comfortable as one that provides an added depth of focus by introducing a controlled level of image blur. Image blur can be introduced in a controlled manner, for example, through the introduction of astigmatism into a viewing zone. The increase of depth of focus provided by PALs of the present invention enhances visual comfort, since it allows a wider variety of viewing postures and distances.

The introduction or allowance of astigmatism within the vision zones of PALs of the present invention can be limited by or based on the first perceptible image blur at most functional contrast levels. Since the neural contrast function peaks at a relatively low spatial frequency, it is possible to optimize visual comfort resulting from the balance of contrast performance and depth of focus at this spatial frequency level. The threshold magnitude of astigmatism allowed within the intermediate and near vision zones of PALS of the present invention can be based on these factors, among others.

According to an aspect of the present invention, by specifying lower gradients of astigmatism adjacent to the viewing zones and by allowing higher thresholds of astigmatism in the viewing zones, larger functional zone widths and lower overall or total astigmatism can achieved in PALs of the present invention. Specifically, through iterative optimization, different designs that vary only in the gradient of astigmatism at the periphery of the near vision zone, and also in the amount of astigmatism permitted in the near vision zone—while having the same add power and add power gradient—can be achieved.

Further, lowering the gradient of astigmatism build-up can result in more comfortable peripheral vision and can increase the functional width of the near vision zone. Consequently, this can lead to fewer head movements and serves to enhance long term visual comfort. Additionally, PALs of the present invention can provide lower maximum astigmatism in comparison to a conventional PAL design of the same add power and same channel length, leading to a reduction in dynamic vision anomalies such as swim.

When the eye moves to the periphery of a viewing zone (e.g., a near distance viewing zone), the eye encounters higher levels of unwanted astigmatism. The amount of visual disturbance caused by this unwanted astigmatism can be exacerbated by the orientation of the particular astigmatism vectors. Specifically, if the astigmatic vectors are obliquely oriented (with respect to the channel) on either side of the viewing zone, then the visual disturbance experienced by the eye can be more significant than compared to the same magnitude of unwanted astigmatism that is less obliquely oriented. Oblique alignment of astigmatic vectors can therefore limit the usable or functional width of a viewing zone. Accordingly, an aspect of the present invention can take into account and even control the direction of astigmatic vectors in terms of the angle between them on both sides of the channel or the intermediate zone. This can be accomplished, in accordance with an aspect of the present invention, by using a merit function that specifies or accounts for astigmatism vector orientation rather than simply astigmatism vector magnitude as is used in most conventional merit functions used to facilitate conventional PAL designs.

For most conventional PAL designs, the astigmatic vectors are generally at an angle with respect to the channel of the PAL (e.g., perpendicular to the channel). This arrangement of astigmatic vectors can be disturbing to a wearer of a conventional PAL as described above and can limit the functional width of a vision zone.

In contrast to these conventional PAL designs, PALs of the present invention can have astigmatic vectors on either side of the PAL of the present invention that are substantially parallel (or within 30 degrees of being parallel) to the channel. This arrangement of the astigmatic vectors can be less disturbing to a wearer of a PAL of the present invention when looking to the left or right of the channel. Further, this arrangement of astigmatic vectors can create a functionally wider channel (i.e., a channel that is more usable than a conventional PAL channel having the same magnitude of astigmatism).

The eye can tolerate a higher magnitude of astigmatism on both sides of a vision zone if the orientations of the astigmatic vectors are less oblique to each other, thus effectively increasing the functional width of the zone. According to an aspect of the present invention, it is possible to modulate this oblique orientation of astigmatic vectors at the edges of the vision zones by introducing additional correcting surfaces. An exemplary correcting surface can comprise a rotationally symmetric continuous zone that is regressive (i.e., a surface having a minimum power at its center). Such a correcting surface may either be introduced as an intermediate surface in a composite lens, on the back surface of the lens, or it may be designed for a specific level of correction of the orientation of astigmatic vectors, then collapsed with the base progressive surface (e.g., onto a single surface). Alternatively, a merit function used to iteratively design PALs of the present invention may be modified to include the orientation as well as the magnitude of astigmatic vectors and a PAL design of the present invention can specify a desired orientation and magnitude at the peripheries of the vision zones.

Figure 2:
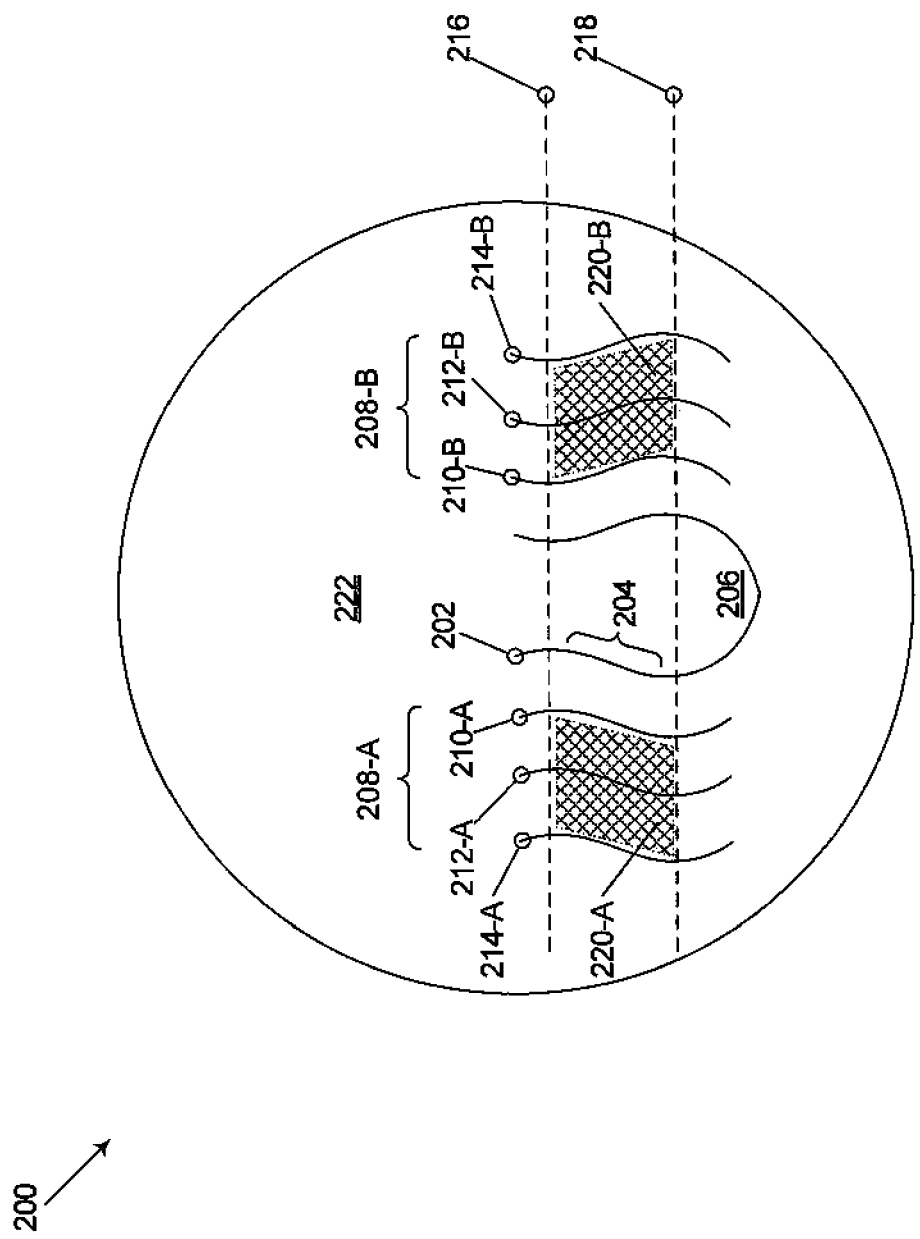
FIG. 2 illustrates an exemplary PAL of the present invention.

FIG. 2 illustrates an exemplary PAL 200 of the present invention. The PAL 200 can have parallelized or non-oblique astigmatism vectors in contrast to many conventional PALs. As shown in FIG. 2, the PAL 200 can comprise a progressive optical power region 202. The progressive optical power region 202 can have a channel or intermediate vision zone 204 linking a far distance vision zone 222 and a near distance vision zone 206.

The PAL 200 can include unwanted astigmatism regions positioned adjacent to a first side of the channel 204 and a second side of the channel 204. Specifically, a first region of unwanted astigmatism 208-A can be located adjacent to a first side of the channel 204 and a second region of unwanted astigmatism 208-B can be located adjacent to a second side of the channel 204. The magnitude of the unwanted astigmatism in each region 208-A and 208-B can increase when moving away from the channel 204 towards a periphery of the PAL 200.

The increase in unwanted astigmatism within each area of unwanted astigmatism 208-A and 208-B can be shown with astigmatism contours. As an example, the first region of unwanted astigmatism 208-A can include first, second and third astigmatism contours 210-A, 212-A and 214-A, respectively. Similarly, the second region of unwanted astigmatism 208-B can include first, second and third astigmatism contours 210-B, 212-B and 214-B, respectively. The first astigmatism contours 210-A and 210-B can indicate, as an example, 0.25 D of astigmatism. The second astigmatism contours 212-A and 212-B can indicate, as an example, 0.50 D of astigmatism. The third astigmatism contours 214-A and 214-B can indicate, as an example, 0.75 D of astigmatism.

According to an aspect of the present invention, the PAL 200 can be designed to include parallelized or aligned (e.g., less oblique or non-oblique) astigmatism vectors within the first and second regions of unwanted astigmatism 208-A and 208-B. Specifically, regions located to the left and right of the channel 204 between a first portion of the total add power 216 and a second portion of the total add power 218 of the PAL 200 can have substantially parallel or aligned astigmatic vectors. As an example, the first portion of the total add power 216 can be 10% of the total add power of the PAL 200 and the second portion of the total add power 218 can be 85% of the total add power of the PAL 200.

As shown in FIG. 2, a first aligned astigmatism vector region 220-A is shown to have a boundary approximately determined by (a) the first and second portions of the total add power 216 and 218 of the PAL 200 and (b) the first astigmatism contour 210-A and the third astigmatism contour 214-A. Similarly, a second aligned astigmatism vector region 220-B is shown to have a boundary approximately determined by (a) the first and second portions of the total add power 216 and 218 of the PAL 200 and (b) the first astigmatism contour 210-B and the third astigmatism contour 214-B.

The astigmatism vectors within the first and second aligned astigmatism vector regions 220-A and 220-B can be more parallel to the channel 204 than astigmatism vectors within corresponding regions of conventional PALs. As an example, the astigmatism vectors within the first and second aligned astigmatism vector regions 220-A and 220-B can be parallel to within 30 degrees of the channel 204.

The location of the maximum unwanted astigmatism region or regions of a lens can have significant impact on the comfort experienced by a wearer. According to an aspect of the present invention, PALs of the present invention can comprise one or more aspheric surfaces. This can enable an increase in astigmatic gradient at the nasal and/or temporal peripheries of a PAL of the present invention, so that there is an island or plateau of astigmatism at a location on the PAL where it is least likely to cause visual disturbance, including peripheral vision. According to an aspect of the present invention, location of the maximum of unwanted astigmatism region of a PAL of the present invention can be another design consideration incorporated into a merit function, for example, by adjusting the weights attached to selected grid point of the lens surface.

Detailed design features of PALs of the present invention are listed below. In general, PALs of the present invention can be designed in accordance with the following:
1. Channel length—defined as the distance between the fitting point and the near point along the principal meridian (center of channel). The near point may be considered to be the point at which the add power is no more than 0.12 D less than the nominal add power.
2. Maximum allowable astigmatism at the far, intermediate and near vision zones.
3. Maximum gradient of astigmatism at the periphery of the far, intermediate and near vision zones.
4. Widths of the far, intermediate and near vision zones.
5. Location of the plateau of maximum astigmatism in the optic.

The following table summarizes exemplary major characteristics of PALs of the present invention.

TABLE 1

| Design Requirements | PAL design: 2.00 D add power, Channel length 15 mm: |
| --- | --- |
| Channel length | 9-18 mm |
| Maximum allowable astigmatism within viewing zones | Far vision zone: 0.0 D to 0.18 D<br>Intermediate vision zone: 0.0 D to 0.35 D<br>near vision zone: 0.0 D to 0.50 D<br>(Vision zone borders can be defined by the location on the resulting PAL where the limiting value of astigmatism is reached) |
| Widths of far, intermediate and near vision zones | Far vision zone: less than or equal to 40 mm<br>intermediate vision zone: less than or equal to 20 mm<br>near vision zone: less than or equal to 20 mm |
| Maximum gradient of astigmatism at the periphery of far, intermediate and near vision zones | Far vision zone: 0.15 D/deg to 0.025 D/deg<br>Intermediate vision zone: 0.20 D/deg to 0.05 D/deg<br>Near vision zone: 0.10 D/deg to 0.05 D/deg<br>(note 2 degrees is approximately 1 mm; measurements are relative to a fitting point of the PAL) |

The following table summarizes exemplary locations of maximum astigmatism in PALs of the present invention (note 2 degrees is approximately 1 mm and locations are made relative to a fitting point of the PAL). Temporal and nasal locations are provided.

TABLE 2

| | X | | Y | |
| --- | --- | --- | --- | --- |
| Side | Upper | Lower | Upper | Lower |
| Temporal boxed location range | 30 deg | 10 deg | −22 deg | −15 deg |
| Nasal boxed location range | −35 deg | −15 deg | −25 deg | −10 deg |

A PAL designed in accordance with the design approach of the present invention can be fabricated into an ophthalmic lens optic using one of several conventional methods of ophthalmic lens manufacturing. As an example, a PAL design of the present invention may be converted into a step file or a sag file and used to fabricate a mold or an insert that can then used to mold the optic out of a moldable plastic material. Additionally, a PAL design of the present invention can be split up or decomposed into two or more different designs (called design elements) each of which can be placed onto a separate surface (e.g., either an internal or external surface).

Any design elements can be molded or free-formed onto a surface of the ophthalmic lens optic. For example, if the final target design for the PAL of the present invention is designated as A, then the design elements may be designated as B and C, so that A=B+C. B can be molded on the front surface of a composite semi-finished blank while C can placed on an intermediate surface that is the interface of the same composite blank. With this exemplary approach, the add power of A comes from contributions made by both B and C.

One method to generate B and C from A is to start with a particular design B, characterized by its sag file, then subtract the sag values of B from A point by point, i.e., A−B=C. This process of linear decomposition provides an adequate approach to the problem. A second approach can use curvatures (curvature as a function of orientation, e.g., [Cx,z] and [Cy,z]) at specified points on A and B. In this case, a set of curvatures can be computed for C by subtracting the curvatures in B from those in A, and then double integrated to obtain the sag file.

A further approach can be to refine the solution by using ray tracing on an eye model in which B and C are placed in front of the pupil of the eye at distances corresponding to their locations in the ophthalmic lens being designed for wear, the retinal image is then computed at a selection of points of B and corresponding points on C at specified zoom angles, defined by object distances. Object distances are selected to define a visual field that is expected to be used by the eye of the wearer of the lens. For example, the object distance is selected to be at infinity or a specified distance between 6 feet and infinity when selecting a point on B that is at or close to the fitting point of B. The object distance is reduced to 60 cm when a point at or near the center of the channel is selected. In each case, the sag of a point in C is computed by optimizing the retinal image computed by rays intersecting both B and C. In all cases, either B or C can each have add power, or only one of them contributes an add power while the other is provided to compensate the surface astigmatism of B point by point. Moreover, either B or C may have no add power at the near vision point or the center of the channel, but may have variations in average or effective power that may vary from point to point, contributed either wholly or in part by the surface astigmatism of the optical surface.

In general, PALs of the present invention can comprise a single layer lens or a multiple layer lens (e.g., a composite lens). For a single layer lens, either the front surface alone, the back surface alone, or the front and back surfaces together can be used to provide desired lens characteristics. Similarly, for a multiple layer lens, either the front surface alone, the back surface alone, an intermediate surface alone, or any combination of surfaces can be used to provide desired lens characteristics. In either case—as a single layer or composite lens—PALs of the present invention can be realized by placing component design elements onto one or more surfaces so as to be in optical communication as one skilled in the pertinent art will appreciate. Further, a PAL of the present invention can include one or more discontinuities. Additionally, a PAL of the present invention can include a second intermediate distance viewing zone positioned below a near vision zone.

Conclusion

While various embodiments of the present invention have been described above, it should be understood that they have been presented by way of example and not limitation. Lenses of the present invention can be semi-finished lens blanks, finished lenses and unfinished lens blanks. It will be apparent to one skilled in the pertinent art that various changes in form and detail can be made therein without departing from the spirit and scope of the invention. Therefore, the present invention should only be defined in accordance with the following claims and their equivalents.

What is claimed is:

1. An ophthalmic lens, comprising:
   a progressive optical power region having a channel, said progressive optical power region providing a far distance vision zone, an intermediate distance vision zone and a near distance vision zone; and
   unwanted astigmatism regions with at least one region positioned adjacent to a first side of the channel and at least a second region positioned adjacent to a second side of the channel,
   wherein astigmatism vectors within the unwanted astigmatism regions between a first portion and a second portion of a total add power of the ophthalmic lens and between a first unwanted astigmatism level on each side of the channel and a second unwanted astigmatism level on each side of the channel are parallel to the channel to within 30 degrees, and
   wherein the first portion of the total add power of the ophthalmic lens is approximately 10%, and the second portion of the total add power of the ophthalmic lens is approximately 85%.

2. The ophthalmic lens of claim 1, wherein the first unwanted astigmatism level is approximately 0.25 D.

3. The ophthalmic lens of claim 1, wherein the second unwanted astigmatism level is approximately 0.75 D.

4. The ophthalmic lens of claim 1, wherein the ophthalmic lens is a single layer lens having a front surface and a back surface.

5. The ophthalmic lens of claim 1, wherein the ophthalmic lens comprises two or more layers having one or more buried surfaces.

6. The ophthalmic lens of claim 1, wherein the channel has a length of 17 mm or less.

7. The ophthalmic lens of claim 1, further comprising a discontinuity.

8. The ophthalmic lens of claim 7, wherein the discontinuity is positioned below the near distance vision zone of the progressive optical power region.

9. The ophthalmic lens of claim 1, further comprising a second intermediate distance vision zone positioned below the near distance vision zone.

* * * * *